United States Patent [19]

Mokwa et al.

[11] Patent Number: 5,583,296
[45] Date of Patent: Dec. 10, 1996

[54] LAYERED DIAPHRAGM PRESSURE SENSOR WITH CONNECTING CHANNEL

[75] Inventors: Wilfried Mokwa, Krefeld; Michael Kandler, Erftstadt; Jörg Amelung, Krefeld, all of Germany

[73] Assignee: Fraunhofer-Gesellschaft zur Forderung Der Angewandten Forschung E. V., Munich, Germany

[21] Appl. No.: 436,251

[22] PCT Filed: Jan. 19, 1993

[86] PCT No.: PCT/DE93/00048

§ 371 Date: May 17, 1995

§ 102(e) Date: May 17, 1995

[87] PCT Pub. No.: WO94/17383

PCT Pub. Date: Aug. 4, 1994

[51] Int. Cl.$^6$ .............. G01L 7/08; G01L 9/12; G01L 15/00
[52] U.S. Cl. .............. 73/718; 73/726; 73/727; 73/717; 73/720
[58] Field of Search .............. 73/718, 717, 720, 73/721, 723, 724, 725, 726, 727

[56] References Cited

U.S. PATENT DOCUMENTS

| | | | |
|---|---|---|---|
| 3,930,412 | 1/1976 | Mallon et al. | 73/938 |
| 4,276,533 | 6/1981 | Tominaga et al. | 73/727 X |
| 4,589,054 | 5/1986 | Kuisma | 73/718 X |
| 4,622,856 | 11/1986 | Binder et al. | 73/727 |
| 4,790,192 | 12/1988 | Knecht et al. | 73/721 |

FOREIGN PATENT DOCUMENTS

| | | |
|---|---|---|
| 0339981 | 11/1989 | European Pat. Off. . |
| 0500234A2 | 8/1992 | European Pat. Off. . |
| WO91/12507 | 8/1991 | WIPO . |

OTHER PUBLICATIONS

"The Role of Thin Films in Integrated Solid–State Sensors", K. Wise, 8257A Jrnl of Vacuum Science & Technology/A, 4 (1986) May–Jun., No. 3, Part 1, Woodbury, NY USA.

*Primary Examiner*—Richard Chilcot
*Assistant Examiner*—Joseph L. Felber
*Attorney, Agent, or Firm*—Ohlandt, Greeley, Ruggiero & Perle

[57] ABSTRACT

A pressure sensor comprises a substrate and a layer defining together with said substrate a pressure sensor cavity, said layer including a diaphragmlike area which is adapted to be acted upon by an external pressure. A micro-miniaturizable pressure sensor of the above-mentioned type, which is used for differential pressure measurement or for relative pressure measurement, is provided on the basis of the features that said cavity is followed by a channel which extends along the surface of said substrate, said channel comprising a layered structure including also the layer which also defines the diaphragmlike area of the pressure sensor, the ratio of the width of the channel to the thickness of the layered structure above the channel being smaller than the ratio of the smallest extension of the diaphragmlike area in the diaphragm plane to the thickness of the diaphragmlike area.

7 Claims, 8 Drawing Sheets

LAYERED DIAPHRAGM PRESSURE SENSOR WITH CONNECTING CHANNEL

Quite generally, the present invention deals with the field of pressure sensors. The invention deals in particular with a relative pressure sensor which can be implemented as a micromechanical structure having extremely small dimensions.

In other words, the present invention refers to a pressure sensor comprising a substrate and a layer defining together with said substrate a cavity, said layer including above said cavity a diaphragmlike area which is adapted to be acted upon by a first pressure prevailing outside of said cavity, according to the generic clause of patent claim 1. Pressure sensors which are adapted to be implemented by methods in the field of micromechanics and especially by methods in the field of surface micromechanics have been disclosed in a great number of manifestations in the more recent scientific literature and in the more recent patent literature.

The applicant's international patent application PCT/DE91/00107 (publication number WO91/12507), for example, shows an absolute pressure sensor, which can be produced from a semiconductor material, especially from silicon, by micromechanical methods and which comprises a substrate having provided therein, by means of adequate doping, a conductive semiconductor region which is arranged such that it is insulated from the substrate, a pressure sensor structure being formed on this conductive semiconductor region in said semiconductor substrate by applying first a spacer layer to said substrate, whereupon a polycrystalline semiconductor layer is deposited on said spacer layer, whereupon the polycrystalline semiconductor layer is doped and the spacer layer, which can also be referred to as sacrificial layer, is removed by etching via suitable channels. Finally, the channels are closed by depositing a suitable material. The structure obtained is a capacitive pressure sensor structure in which the polycrystalline semiconductor layer defines together with the substrate a closed cavity, which can, for example, be evacuated or which can be filled with a gas having a predetermined pressure. Although such a pressure sensor is very advantageous insofar as it permits detection of an absolute pressure with high measurement accuracy as well as insofar as it is compatible with CMOS circuits due to the fact that the semiconductor region is insulated from the substrate, said pressure sensor is limited with respect to the fact that it only permits detection of an absolute pressure.

Relative pressure sensors and pressure sensors for differential pressure measurements, which have been realized by micromechanical techniques, are already known. For example, the technical publication Journal of Vacuum Science & Technology/A, Vol. 4, No. 3, May to June 1986, part 1, page 618, column 2, last paragraph to page 619, column 1, first paragraph, in connection with FIG. 3, shows a relative pressure sensor which is composed of semiconductor materials and which comprises a substrate and a polysilicon layer defining together with said substrate a cavity, said substrate being provided with a rear opening which has been formed by anisotropic etching from the back of the substrate to said cavity. In the course of the pressure sensor production process, a spacer layer or sacrificial layer is removed by etching through this rear opening by means of hydrofluoric acid for defining the future pressure sensor cavity. It turned out that such relative pressure sensors only show insufficient mechanical stability, in particular in the case of overload. In addition, it turned out that such relative pressure sensors show a spread with regard to their detection sensitivity; in the case of a capacitive relative pressure sensor, for example, a spread with respect to the quotient of the capacitance change related to the pressure change, such a spread occurring even within a single production lot.

It follows that, taking as a basis the above-described prior art, it is the object of the present invention to provide a pressure sensor by means of which a pressure difference can be measured and which permits microminiaturization to a large extent while achieving good reproducibility of the detection sensitivity within one production lot of pressure sensors.

This object is achieved by a pressure sensor according to patent claim

In contrast to the prior art which teaches direct access to the cavity of the pressure sensor via a rear opening of the substrate, the present invention teaches that the internal pressure for the pressure sensor cavity should be supplied via a channel extending along the surface of the substrate. Furthermore, the present invention provides the feature that this channel is defined relative to the substrate by a layered structure comprising at least the first layer which also forms the diaphragmlike area of the pressure sensor. In addition, the present invention demands that the ratio of the width of the channel to the thickness of the layered structure above the channel must be smaller than the ratio of the smallest extension of the diaphragmlike area in the diaphragm plane to the thickness of the diaphragmlike area. This will guarantee that, inspite of the fact that the channel extends close to the surface, a deformation of the overall structure which would be worth mentioning will only take place in the area of the diaphragmlike area, whereas the structure of the pressure sensor in the area of the channel remains essentially uninfluenced by differential pressure changes. The present invention teaches a separation of the location of the actual pressure sensor function, which comprises the detection of the differential pressure by deflection of the diaphragmlike area and the electrical detection of the deflection of the diaphragmlike area as well as the mechanical functions of overload resistance and of a tensionfree diaphragm support, from the location of the function of supplying one of the two pressures to the pressure sensor cavity, said function being achieved by the channel structure having the structural design according to the present invention. The functional separation provided by the present invention is in contrast to the prior art, since relative pressure sensors according to the prior art introduce tensions in the diaphragm area through the rear opening of the substrate below the diaphragmlike area, since said relative pressure sensors show, in the case of a capacitive detection of the diaphragm deflection, a dependence of the detection capacity on the hardly definable dimension of the front exit of the rear opening, and since the overload resistance of the pressure sensor of this prior art pressure sensor structure is limited.

In spite of its ability to measure differential pressures, the pressure sensor structure according to the present invention allows to achieveall the advantages of the absolute pressure sensor described at the beginning, including the increased measurement accuracy and the compatibility with CMOS circuits of said absolute pressure sensor.

Preferred further developments of the pressure sensor according to the present invention are defined in the subclaims.

BRIEF DESCRIPTION OF THE DRAWINGS

FIG. 5 shows a cross-sectional representation of a first embodiment of a pressure sensor unit comprising a housing and the first embodiment of the pressure sensor shown in FIG. 3a;

DETAILED DESCRIPTION OF THE INVENTION

Figure 1:
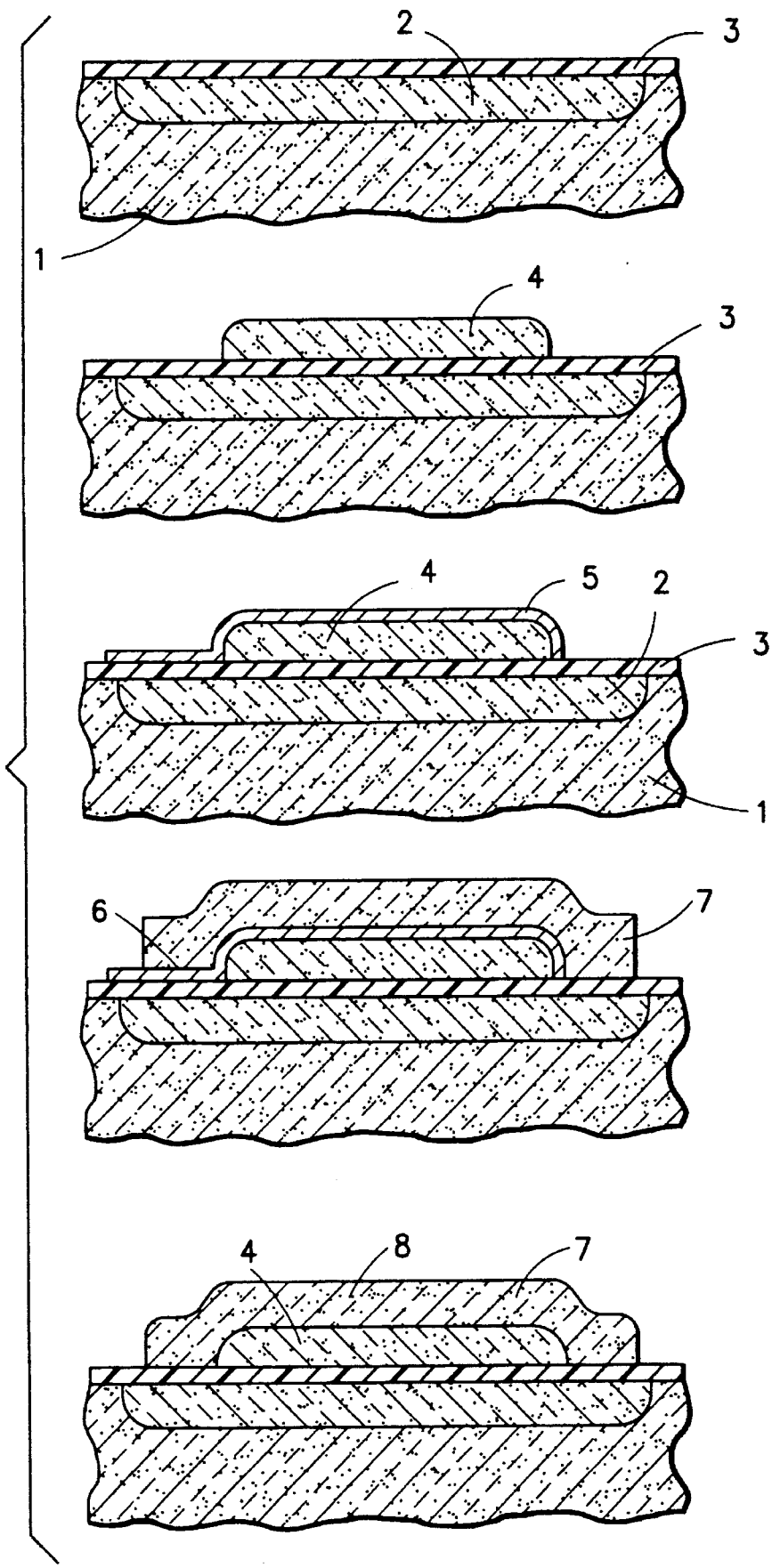
FIG. 1 shows cross-sectional representations for explaining manufacturing steps in the production of pressure sensors.

As can be seen in FIG. 1, the production of a pressure sensor according to the present invention comprises the step of providing a substrate 1, which is a p-silicon substrate in the preferred embodiment, first with a doping opposite to the conductivity type of the substrate, said doping being provided within a doping region 2 by means of measures which are, in principle, customary photolithographic measures. It follows that, on the p-substrate 1 shown, an $n^+$ doping region 2 is produced, on the one hand for the purpose of forming an electrode having a good conductivity and on the other hand for insulating this electrode, which is defined by the doping region 2, from the substrate 1 by a pn junction. Subsequently, an insulating layer 3 is applied.

This insulating layer 3 has applied thereto a spacer layer 4, which is also referred to as sacrificial layer, e.g. by a deposition of silicon dioxide. This spacer layer 4 is structured by means of photolithographic measures, which are known per se, so as to determine the future pressure sensor cavity, said pressure sensor cavity being arranged centrally above the doping region 2. Subsequently, an additional oxide layer 5 is deposited and photolithographically structured so as to determine future etching channels 6. Following this, a polysilicon layer 7 is deposited, said polysilicon layer 7 being conductively doped at least in the area of a future diaphragmlike area 8 above a pressure sensor cavity. The spacer layer 4, 5, which consists of an oxide, is removed by etching effected by means of hydrofluoric acid through the etching channel 6, whereupon said etching channels 6 are closed by depositing a suitable material, such as an oxide layer.

Figure 2:
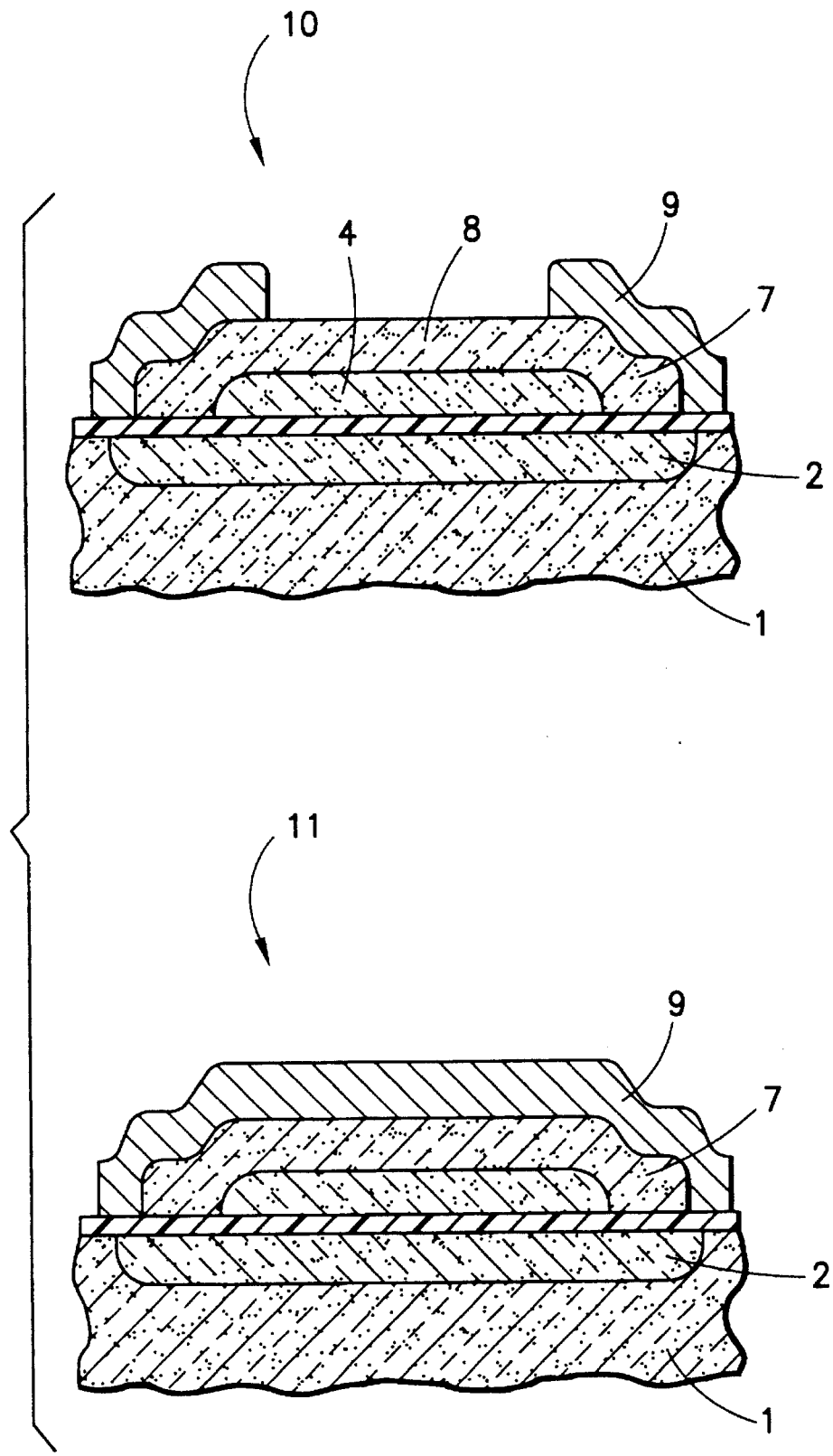
FIG. 2 shows cross-sectional representations of a pressure sensor and of an associated reference element.

As can be seen in FIG. 2, a final oxide layer 9 can be removed by etching in the area of the diaphragmlike area 8 so as to form a pressure sensor, which is designated generally by reference numeral 10 in FIG. 2, whereas for the purpose of defining a reference element, which has a corresponding basic capacity and which is designated generally by reference numeral 11, this oxide layer 9 remains unchanged.

Figure 3A:
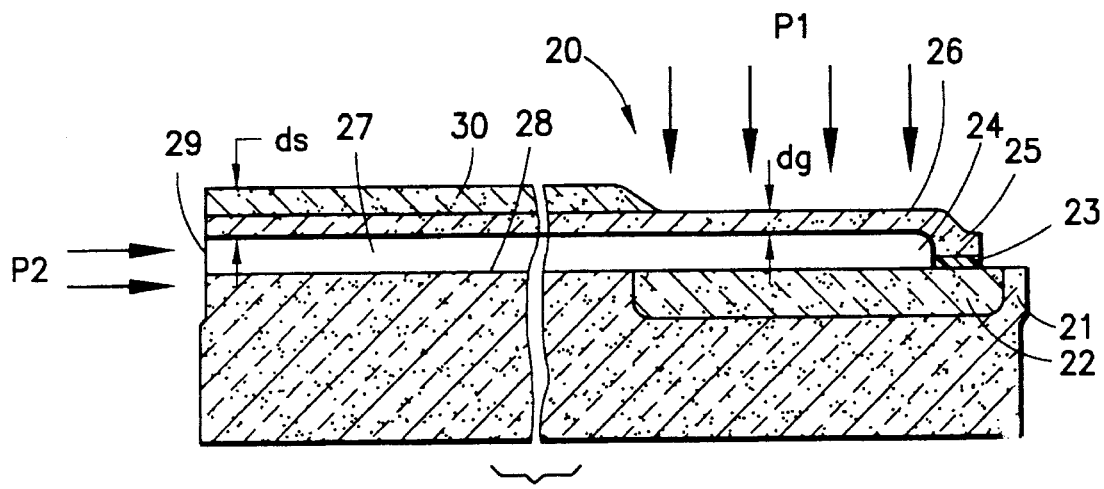
FIG. 3a shows a first embodiment of the pressure sensor according to the present invention in a cross-sectional representation.

A cross-sectional view of a first embodiment of a pressure sensor according to the present invention, which is designated generally by reference numeral 20, will be explained hereinbelow making reference to FIG. 3a. This pressure sensor comprises a substrate 21 with a doping region 22, the doping being again chosen such that it is opposite to the conductivity type of the substrate 21. Above an insulating layer 23, a first polysilicon layer 25 is provided, which defines a pressure sensor cavity 24 and which defines a diaphragmlike thin area 26 above said doping region 22. This diaphragmlike area 26 is adapted to be acted upon by a first pressure, which can also be called external pressure.

Starting from the pressure sensor cavity 24, a channel 27, which borders on the cavity 24, extends along the surface 28 of the substrate 21, said channel 27 ending in a lateral opening 29 in the embodiment shown in the present connection.

The channel is defined relative to. the substrate 21 by a layered structure comprising, on the one hand, the first polysilicon layer 25, which includes the diaphragmlike area 26 of the pressure sensor 20, and, on the other hand, a reinforcement layer 30 deposited thereon. Said reinforcement layer 30 located above the first polysilicon layer 25 may consist of polysilicon as well. It is also imaginable to use silicon dioxide or silicon nitride for forming this reinforcement layer.

Figure 4:
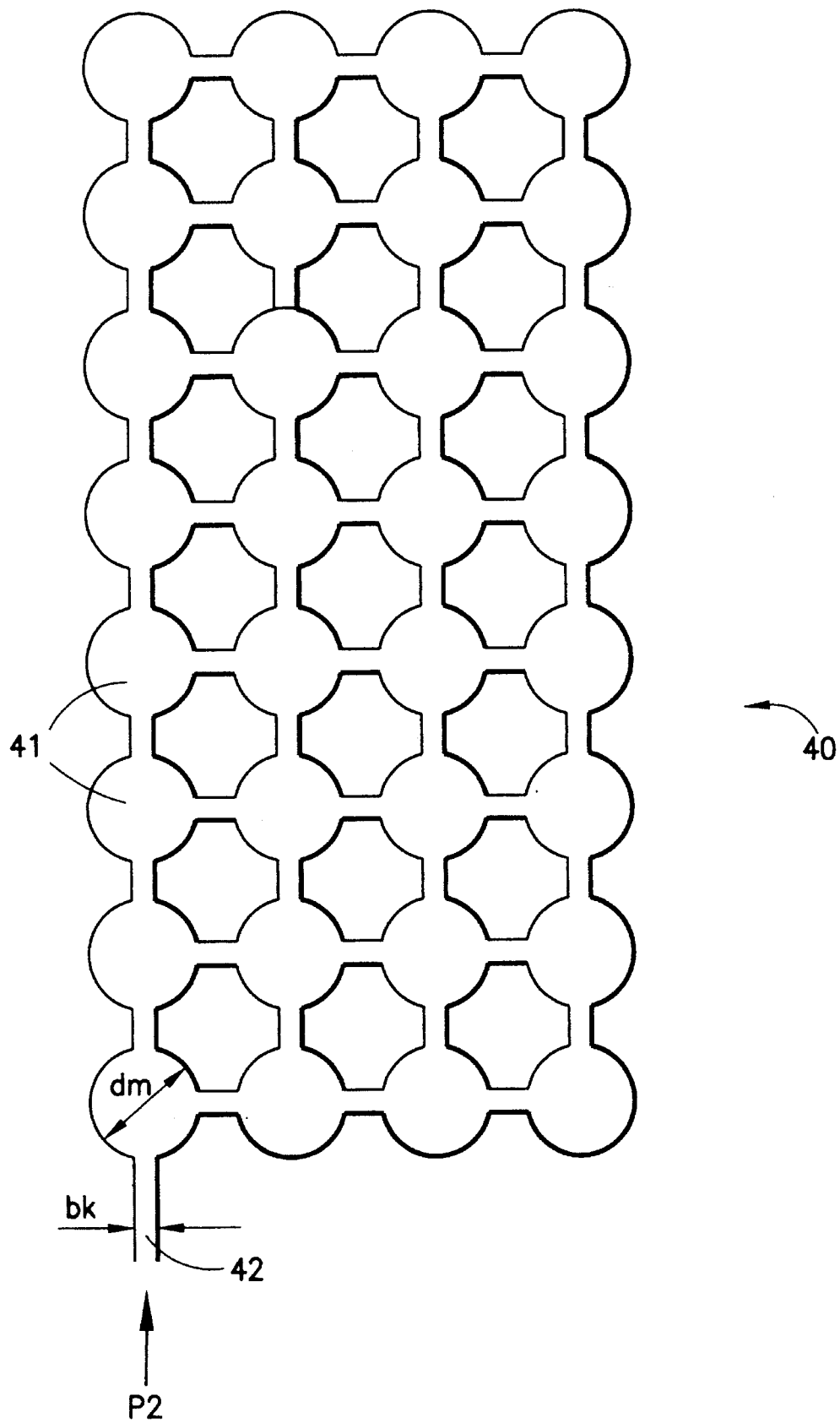
FIG. 4 shows a top view of an array of pressure sensors according to the present invention in accordance with a third embodiment.

As is clearly evident especially from the top view according to FIG. 4, which shows a pressure sensor array 40 comprising a plurality of interconnected pressure sensors 41, the width bk of the channel 42 is preferably smaller than the diameter or the smallest lateral extension dm of the diaphragmlike area of each pressure sensor 41. Quite generally, the ratio of the width bk of the channel 27, 42 to the thickness ds of the layered structure 25, 30 above the channel must be smaller than the ratio of the smallest extension dm of the diaphragmlike area 26, 41 in the diaphragm plane to the thickness dg of the diaphragmlike area 26. This will guarantee that the differential pressure between the first pressure P1, which acts on the diaphragm 26 from outside, and the second pressure P2, which is introduced in the pressure sensor cavity 24 via channel 27, will only deform the diaphragmlike area 26 without causing any deformation of the layered structure 25, 30 in the area of the channel which would be worth mentioning.

When the above-mentioned dimensions are used, the additional reinforcement layer 30 can be dispensed with, provided that the channels 27 are sufficiently narrow; said reinforcement layer 30 is, however, considered to be advantageous.

Figure 3B:
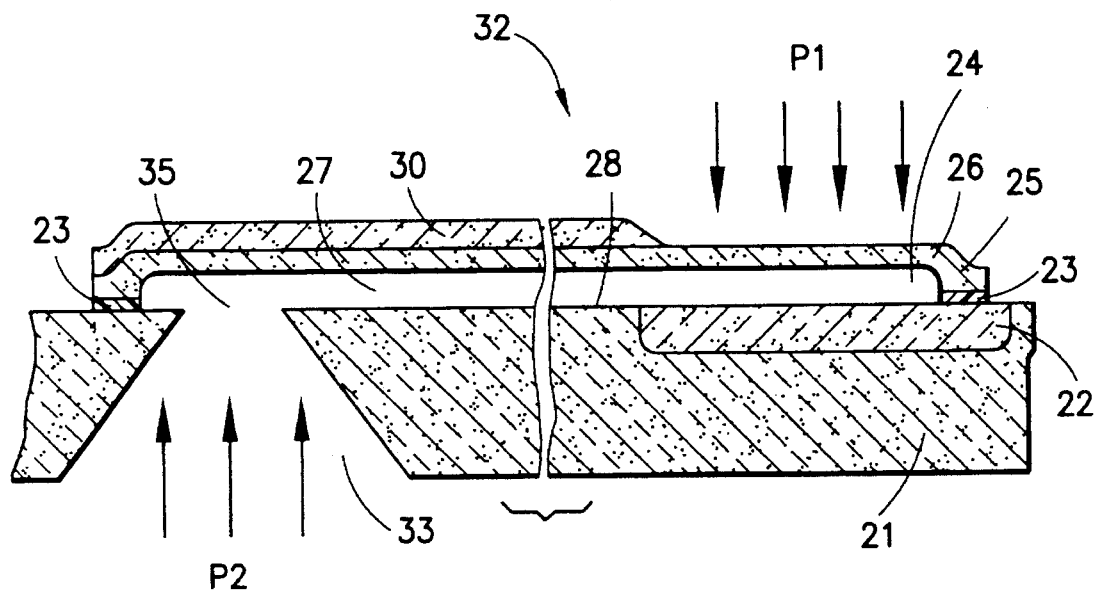
FIG. 3b shows a second embodiment of the pressure sensor according to the present invention in a cross-sectional representation.

With the exception of the differences described hereinbelow, the second embodiment of a pressure sensor, which is designated generally by reference numeral 32 in FIG. 3b, corresponds to the first embodiment of the pressure sensor 20, which has been described with reference to FIG. 3a; like reference numerals have been used to designate identical or similar components. Deviating from the first embodiment of the pressure sensor 20, the lateral opening 29 of channel 27 has not been provided in the present case, said channel 27 being closed with respect to the substrate 21 by means of the first polysilicon layer 25 as well as by the reinforcement layer 30 on the side facing away from the pressure sensor cavity 24. Below said channel 27, the substrate 21 has a rear opening 33 produced e.g. by anisotropic etching. Said rear opening extends from the rear 34 of the substrate 21 through said substrate 21 up to the front side or surface 28 of said substrate 21 in such a way that the front exit 35 of said rear opening 33 is positioned outside of the diaphragmlike area 26 and exclusively in the area of the channel 27.

Figure 5:
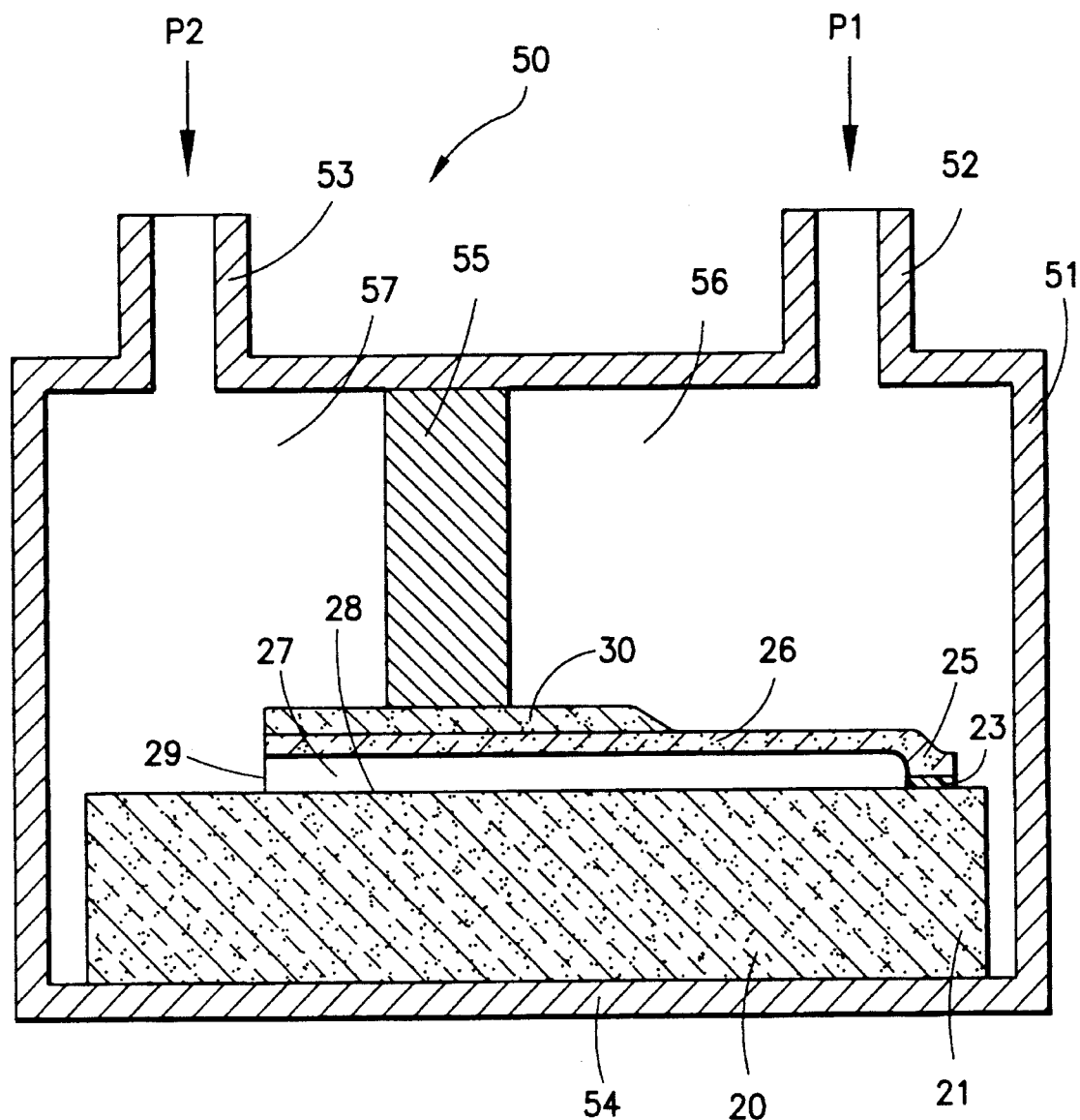

FIG. 5 shows a sectional view through a first embodiment of a pressure sensor unit, which is designated generally by reference numeral 50 and which comprises a housing 51 as well as the first embodiment of the pressure sensor 20 which has been described with reference to FIG. 3a. The housing 51 has two spaced connection pipes 52, 53 through which said first pressure P1 and said second pressure P2 can be applied. The pressure sensor 20 is secured in position on the back of the silicon substrate 21 relative to the base 54 of the housing 51, e.g. by means of an adhesive connection. The housing is subdivided by means of a partition 55 into two housing areas 56, 57 for the first pressure P1 and the second pressure P2, respectively. The partition extends essentially vertically with respect to the longitudinal direction of the channel 27 and is in sealing contact with the pressure sensor 20 in the area of the reinforcement layer 30 of said pressure sensor.

Figure 6:
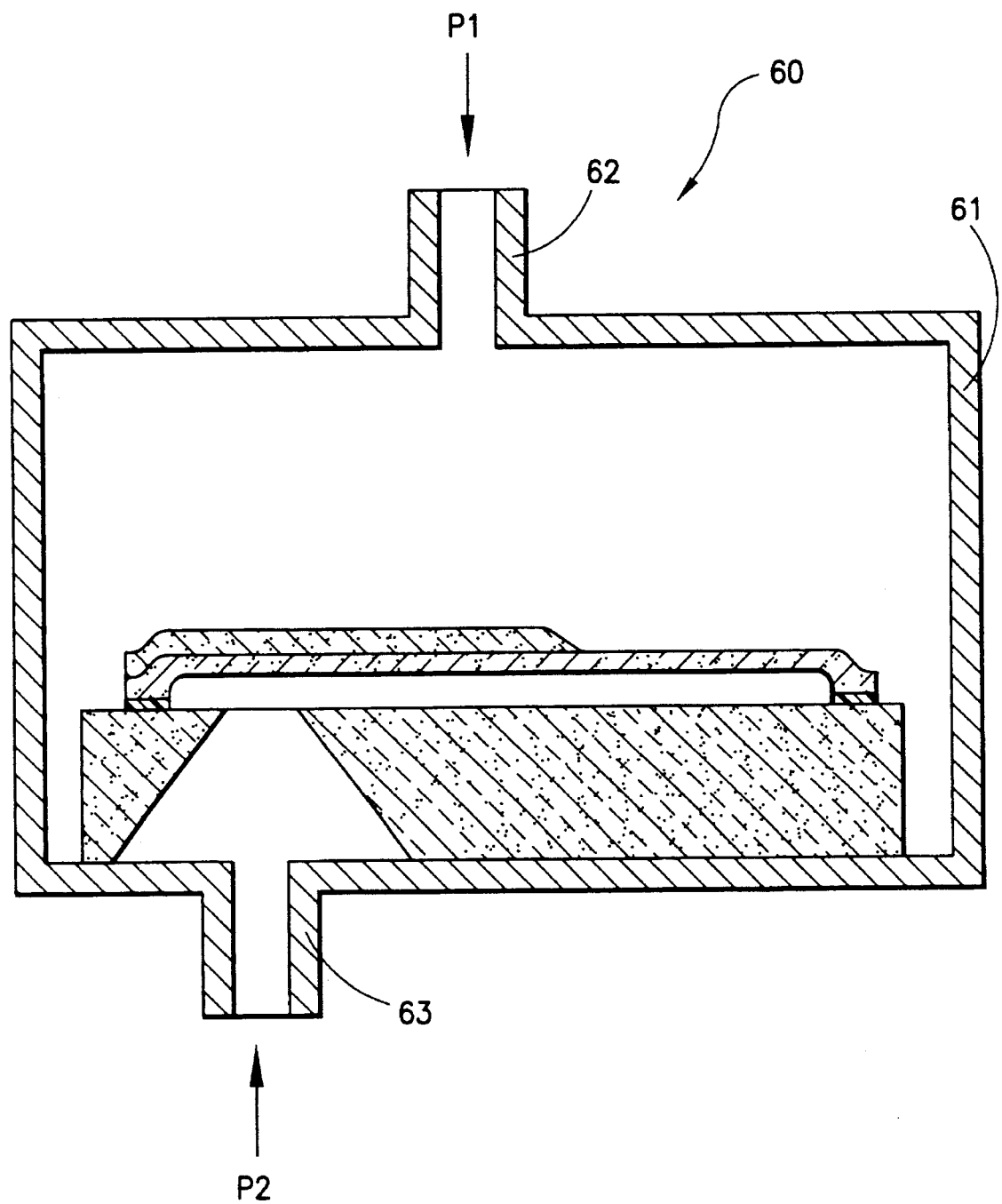
FIG. 6 shows a cross-sectional representation of a second embodiment of a pressure sensor unit comprising a housing and the second embodiment of the pressure sensor shown in FIG. 3b.

FIG. 6 shows a second embodiment of a pressure sensor unit, which is designated generally by reference numeral 60. Also this embodiment comprises a housing 61 provided with two connection pipes 62, 63 which are used for applying said first pressure P1 and said second pessure P2. The connection pipes 62, 63 of this embodiment are, however, preferably provided on opposite walls of the housing 61. The second embodiment of the pressure sensor 32, which has been described with reference to FIG. 3b, is secured in position by means of an adhesive connection opposite the wall from which the connection pipe 63 extends, said pressure sensor 32 being positioned such that its rear opening 33 is located above said connection pipe 63.

As has already been explained with reference to FIG. 4, a pressure sensor unit formed on a wafer may be a pressure sensor array 40 comprising a plurality of pressure sensors 41. In the case of capacitive evaluation, the individual electrodes will be connected in parallel so as to achieve an increased sensitivity by means of this arraylike arrangement. In such a pressure sensor array, the individual pressure sensors are interconnected by channels having a shape which largely corresponds to that of channel 27 which has been described in detail.

Figure 7:
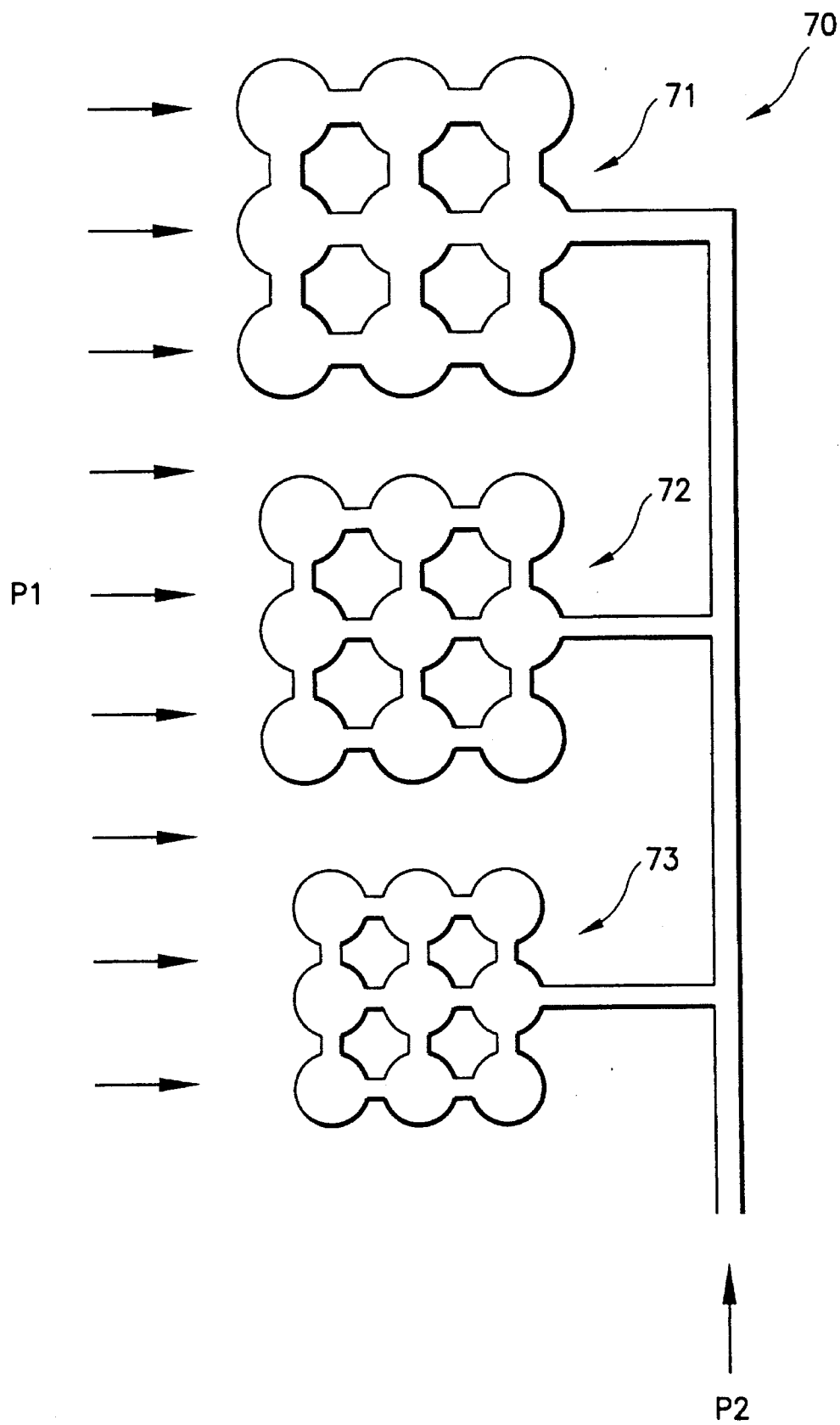
FIG. 7 shows a top view of an arrangement of pressure sensors with different diaphragm sizes for different pressure ranges.

If a detection of different pressure ranges by means of a single pressure sensor array is desired, the embodiment which is shown in a top view in FIG. 7 and which is designated generally by reference numeral 70, will be used.

This arrangement of pressure sensors 70 comprises three pressure sensor arrays 71, 72, 73, the surfaces of the diaphragmlike areas of the pressure sensor array 71 being larger than those of the pressure sensor array 72, which are, in turn, larger than those of the pressure sensor array 73. The last-mentioned pressure sensor array 73 is thus used for detecting a high pressure range, the second-mentioned pressure sensor array 72 serves to detect the medium pressure range, whereas the first-mentioned pressure sensor array 71 is provided for a low pressure range.

Figure 8:
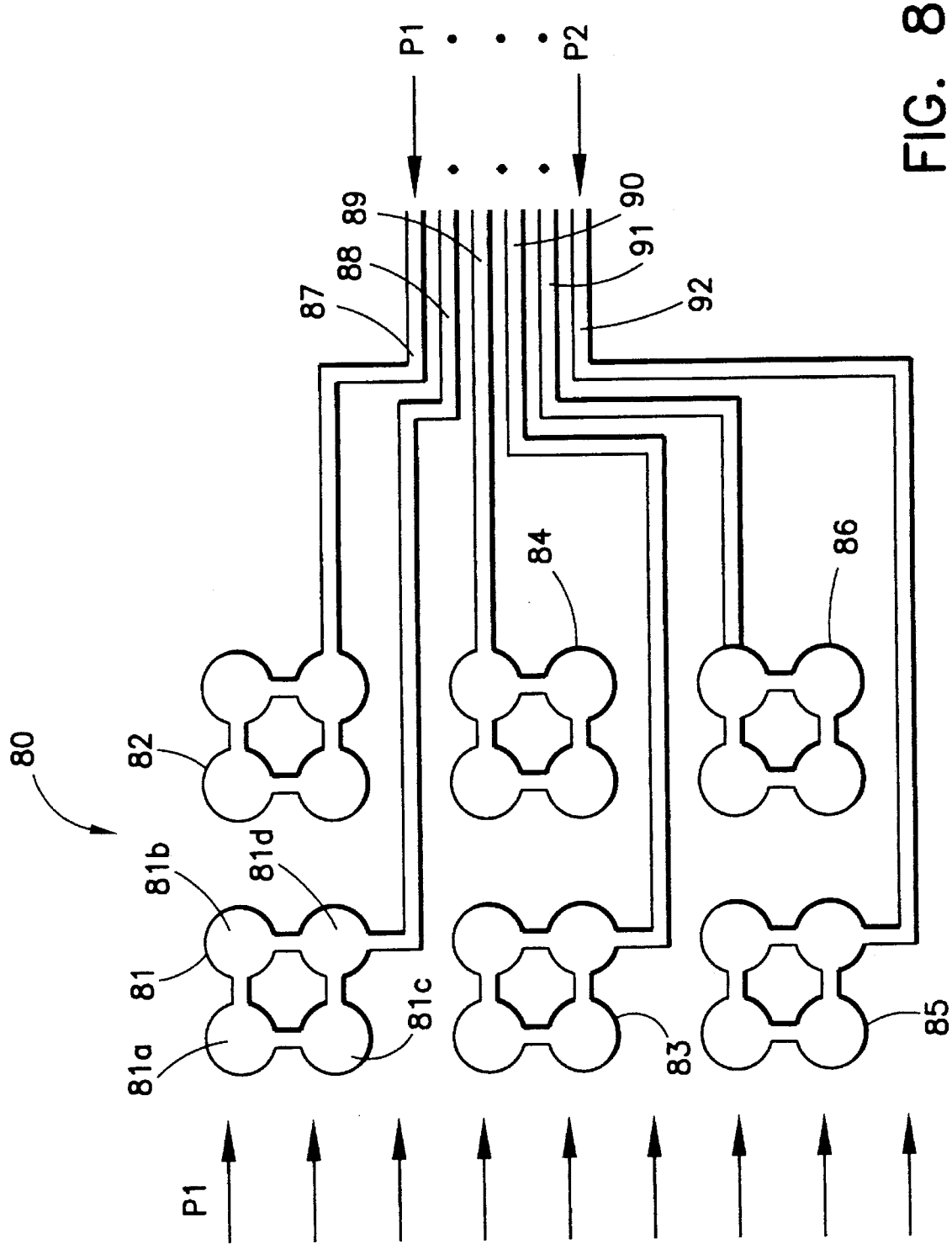
FIG. 8 shows a top view of a pressure measurement arrangement used for detecting a pressure distribution with high spatial resolution.

FIG. 8 shows a top view of an additional pressure sensor array which is designated generally by reference numeral 80. This arrangement of pressure sensors comprises six pressure sensor arrays 81, 82, 83, 84, 85, 86, which are arranged on a single chip and each of which comprises a plurality of preferably four pressure sensors 81a, 81b, 81c, 81d, which are interconnected by channels. Each of said pressure sensor arrays 81, 82, 83, 84, 85, 86 is connected to a channel 87, 88, 89, 90, 91, 92. The channels are concentrated into a pressure detection area 93 of limited dimensions on said chip so as to permit here the measurement of a pressure distribution P2, ... , P7 with a comparatively high spatial resolution.

We claim:

1. A pressure sensor comprising a substrate, and a first layer of relatively uniform thickness deposited on said substrate and defining a cavity, said layer including above said cavity a diaphragm like area which is adapted to be acted upon by a pressure prevailing outside of said cavity, a channel which borders on said cavity and which extends along the surface of said substrate below said deposited first layer, said channel being adapted to be acted upon by a second pressure, wherein said channel is defined, on the one hand, by a layered structure comprising said first layer and a second layer deposited on said first layer so as to cover and reinforce said first layer, and, on the other hand, by said substrate, said second layer not extending over the diaphragmlike area, and the ratio of the width of the channel to thickness of the layered structure above the channel being smaller than the ratio of the smallest extension of the diaphragmlike area in the diaphragm plane to the thickness of the diaphragmlike area.

2. A pressure sensor according to claim 1, wherein the first layer consists of polysilicon, and the second layer consists of polysilicon.

3. A pressure sensor according to claim 1, wherein the first layer consists of polysilicon, and the second layer consists of silicon dioxide.

4. A pressure sensor according to claim 1, wherein the first layer consists of polysilicon, and the second layer consists of silicon nitride.

5. A pressure sensor according to claims 1 wherein the substrate is provided with a rear opening extending from the rear of the substrate through said substrate and up to the channel.

6. An arrangement of pressure sensors, comprising a plurality of pressure sensors formed on a chip, wherein each pressure sensor comprises:

a substrate, and a first layer of relatively Uniform thickness deposited on said substrate and defining a cavity, said layer including above said cavity, a diaphragmlike area which is adapted to be acted upon by a pressure prevailing outside of said cavity, a channel which borders on said cavity and which extends along the surface of said substrate below said deposited first layer, said channel being adapted to be acted upon by a second pressure, wherein said channel is defined, on the one hand, by a layered structure comprising said first layer and a second layer deposited on said first layer so as to cover and. reinfOrCe first layer, and, on the other hand, by said substrate.

said second layer not extending over the diaphragmlike area, and the ratio of the width of the channel to the thickness of the layered structure above the channel being smaller than the ratio of the smallest extension of the diaphragmlike area in the diaphragm plane to the thickness of the diaphragmlike area.

7. An arrangement of pressure sensors according to claim 6, wherein each of said pressure sensors is provided with a channel bordering on the cavity of the respective pressure sensor, and the channels are concentrated into a pressure detection area on said chip so as to detect a pressure distribution with high spatial resolution.

* * * * *

UNITED STATES PATENT AND TRADEMARK OFFICE
CERTIFICATE OF CORRECTION

PATENT NO. : 5,583,296
DATED : December 10, 1996
INVENTOR(S) : Wilfried Mokwa, Michael Kandler, Jorg Amelung It is certified that error appears in the above-identified patent and that said Letters Patent is hereby corrected as shown below:

At Col. 5, line 65, delete "diaphragm like" and insert --diaphragmlike-- therefor.

At Col. 6, line 11, delete "diaphragml ike" and insert --diaphragmlike-- therefor.

At Col. 6, line 26, delete "claims" and insert --claim-- therefor.

At Col. 6, line 34, delete "Uniform" and insert --uniform-- therefor.

At Col. 6, line 46, delete "and." and insert --and-- therefor.

At Col. 6, line 47, delete "reinfOrCe" and insert --reinforce-- therefor.

At Col. 6, line 48, delete "." and insert --,-- therefor.

Signed and Sealed this

Fifteenth Day of July, 1997

*Attest:*

BRUCE LEHMAN

*Attesting Officer*       *Commissioner of Patents and Trademarks*